US009225402B2

(12) United States Patent
Gollakota et al.

(10) Patent No.: US 9,225,402 B2
(45) Date of Patent: Dec. 29, 2015

(54) RANDOM ACCESS HETEROGENEOUS MIMO NETWORK

(75) Inventors: Shyamnath Gollakota, Seattle, WA (US); Dina Katabi, Cambridge, MA (US); Ching-Ju Lin, Taipei (TW)

(73) Assignee: Massachusetts Institute of Technology, Cambridge, MA (US)

( * ) Notice: Subject to any disclaimer, the term of this patent is extended or adjusted under 35 U.S.C. 154(b) by 239 days.

(21) Appl. No.: 13/562,907

(22) Filed: Jul. 31, 2012

(65) Prior Publication Data
US 2013/0064114 A1    Mar. 14, 2013

Related U.S. Application Data

(60) Provisional application No. 61/513,640, filed on Jul. 31, 2011.

(51) Int. Cl.
*H04B 7/04* (2006.01)
*H04B 5/00* (2006.01)
*H04L 27/00* (2006.01)
*H04L 1/00* (2006.01)

(52) U.S. Cl.
CPC ............ *H04B 7/0452* (2013.01); *H04B 5/0018* (2013.01); *H04L 27/0006* (2013.01); *H04L 1/0002* (2013.01)

(58) Field of Classification Search
CPC ................................ H04B 5/0018; H04B 5/00
USPC .................... 370/252, 329, 315; 455/561, 523
See application file for complete search history.

(56) References Cited

U.S. PATENT DOCUMENTS

| 5,432,838 | A  | * | 7/1995  | Purchase et al. ............... 455/523 |
| 2004/0229650 | A1 | * | 11/2004 | Fitton et al. ................... 455/561 |
| 2010/0080173 | A1 |   | 4/2010  | Takagi |
| 2011/0176627 | A1 |   | 7/2011  | Wu et al. |

FOREIGN PATENT DOCUMENTS

WO    WO 2009/027931    3/2009

OTHER PUBLICATIONS

Coviello et al., "A Robust Approach to Carrier Sense for MIMO Ad Hoc Networks,"ICC '09 IEEE International Conference on Communications 2009., Jun. 14, 2009, pp. 1-6 XP031505638.

* cited by examiner

*Primary Examiner* — Raj Jain
(74) *Attorney, Agent, or Firm* — Occhiuti & Rohlicek LLP

(57) ABSTRACT

A number of techniques, which may be used together, provide distributed coordination of multiple stations so that concurrent transmissions and increased throughput are achieved on a shared radio medium. Each of the techniques provides a separate innovation that can be used alone or in combination with one or more of the other techniques.

14 Claims, 8 Drawing Sheets

RANDOM ACCESS HETEROGENEOUS MIMO NETWORK

CROSS-REFERENCE TO RELATED APPLICATIONS

This application claims the benefit of U.S. Provisional Application No. 61/513,640, filed on Jul. 31, 2011, the contents of which are incorporated herein by reference.

STATEMENT AS TO FEDERALLY SPONSORED RESEARCH

This invention was made with government support under Grant No. CNS0831660 awarded by the National Science Foundation and under Grant No. W911NF-07-1-0028 awarded by the Army Research Office. The government has certain rights in this invention.

BACKGROUND

Multi-Input Multi-Output (MIMO) technology is emerging as the default choice for wireless networks. The wireless industry is continuously pushing toward increasing the number of antennas per device. While 3×3 MIMO nodes represented the state of the art in 2009, 4×4 MIMO nodes were introduced on the market in 2010. Simultaneously, there is a proliferation of wireless devices with diverse form factors. These range from large devices, like desktops and laptops, to small devices, like temperature or light sensors, and a whole range of devices in between like smartphones and tablets. The physical size of these devices intrinsically limits the maximum number of antennas that they can support, and their differing capabilities and costs mean that they will naturally have different MIMO processing power. The combination of these two trends—a growth in the maximum number of antennas per device, and an increase in device diversity—means that future wireless networks will be populated by heterogeneous access points (APs) and clients supporting different numbers of antennas. For example, today a home user may have a 2- or 3-antenna AP but one of her neighbors may have a single-antenna AP on the same channel. Even inside a single house, users can connect their high definition television to their video server using high-end 4×4 MIMO 802.11n devices, while continuing to use their 2- or 3-antenna wireless AP for the remaining devices in the home, while the home sensor network uses a single-antenna home controller that communicates with the sensors and actuators.

The existing design of 802.11n however uses the blueprint of traditional single-antenna networks, and as a result cannot efficiently support such heterogeneous MIMO networks. Consider for example the network 100 in FIG. 1 where a single-antenna pair 102 is exchanging a packet 103. A nearby 2×2 802.11n system 104 abstains from concurrently transmitting because it senses the medium as occupied. However, this is wasteful because a 2×2 MIMO pair can support two concurrent transmissions, and hence should be able to transmit a packet concurrently with the ongoing single-antenna transmission.

Recently, MIMO networks have attracted much attention from both the theoretical and empirical research communities. This resulted in new powerful theories including virtual MIMO and interference alignment and led to pioneering systems that expanded and validated the theory [5, 7, 1].

Past MIMO systems [1, 7, 5] have generally required concurrent transmissions to be pre-coded together at a single transmitter (as in beamforming [1]), decoded together at a single receiver (as in SAM [7]), or the transmitters or the receivers have to be controlled over the Ethernet by a single master node (as in IAC [5]).

Previous work on carrier sense in the presence of ongoing transmissions is related to packet detection in ZigZag [4] and carrier counting in SAM [7]. These schemes detect the number of concurrent transmissions using preamble correlation.

Some relevant theoretical work is past work on multi-user MIMO, interference alignment and cognitive MIMO. Multi-user MIMO allows multiple clients to be served simultaneously by a single base station that has more antennas than any of the clients. A number of techniques, such as beamforming, dirty paper coding, linear decorrelators, and successive interference cancellation, have been proposed to achieve the capacity of both the uplink and the downlink. More recently, work on interference alignment has shown new capacity results for multi-user MIMO channels. Finally, theoretical work on cognitive MIMO has advocated the use of MIMO to ensure that secondary users can coexist with the primary users, without creating interference to the primary users. These papers provide only theoretical solutions and typically target specific topologies.

References cited above include the following:
[1] Ehsan Aryafar and Naren Anand and Theodoros Salonidis and Edward Knightly. Design and Experimental Evaluation of Multi-User Beamforming in Wireless LANs. *Mobicom*, 2010.
[2] Jacksons Labs: Fury GPSDO, jackson-labs.com.
[3] System Description and Operating Principles for High Throughput Enhancements to 802.11. IEEE 802.11-04/0870r, 2004.
[4] Shyamnath Gollakota and Dina Katabi. ZigZag Decoding: Combating Hidden Terminals in Wireless Networks. *Sigcomm*, 2008.
[5] Shyamnath Gollakota and Samuel Perli and Dina Katabi. Interference Alignment and Cancelation. *Sigcomm*, 2009.
[6] Ettus Inc. Universal Software Radio Peripheral. http://ettus.com.
[7] Kun Tan and He Liu and Ji Fang and Wei Wang and Jiansong Zhang and Mi Chen and Geoffrey Voelker. SAM: Enabling Practical Spatial Multiple Access in Wireless LAN. *Mobicom*, 2009.
[8] D. Tse and P. Vishwanath. *Fundamentals of Wireless Communications*. Cambridge University Press, 2005.
[9] IEEE 802.11 WG. Wireless LAN Medium Access Control (MAC) and Physical Layer (PHY) Specifications. *IEEE*, 1999.

SUMMARY

In many conventional wireless protocols, including 802.11, multiple transmitters contend for the right to transmit over a transmission medium. For instance, in a carrier-sense multiple-access (CSMA) approach, a transmitter does not transmit when it senses the transmission of another transmitter. Therefore once one of the transmitters begins transmission, the other transmitters wait silently for the winning transmitter to finish its transmission before once again contending for the right to transmit. Various approaches are used to deal with situations in which two transmitters begin transmission and collide, including detection of the collision and retrying after a delay. It follows that only one transmitter is allowed to transmit at a time.

It is desirable to allow concurrent transmissions on a radio medium, and with appropriate coordination between transmitter and receiver stations, use of multiple antennas at those stations enables such concurrent transmissions thereby increasing the data throughput over the medium.

In one general aspect, a medium access protocol enables as many concurrent transmissions as permitted by the MIMO transmitter with the maximum number of antennas. The design maintains the fully distributed random access nature of today's 802.11n. A distributed protocol enables MIMO LANs to continue to support bursty traffic and have independent different networks share the same medium without explicit coordination.

A number of techniques are described in this document. These techniques may be used together to provide distributed coordination of multiple stations so that the concurrent transmissions and increased throughput are achieved. Each of the techniques provides a separate innovation that can be used alone or in combination with one or more of the other techniques. Each of these techniques is summarized below.

1 Extended Carrier Sense

In an aspect, in general, a carrier-sense multiple-access (CSMA) approach is used at a station to determine whether the station can safely transmit on the medium concurrently with transmissions from other stations (or interferers on the medium).

In some examples, the station monitors the medium to determine a relationship between signals received at multiple antennas of the station. Based on the relationship between the signals, the station determines whether there is a potential that a further transmission on the medium can be made from its antennas in a relationship suitable for a receiver of the transmission to receive the transmission without interference from the monitored transmissions.

In some examples, the station monitors the medium with N antennas, and determines whether the relationship between the signals received at its antennas represents fewer than N independent transmissions, in which case there is the potential of emitting at least one independent transmission that is not interfered with at the desired receiver of that transmission.

In some examples, a station that desires to transmit over the medium monitors the medium to determine a subspace where transmissions from other transmitters exist. The transmitter projects on a space orthogonal to the determined subspace and performs carrier sense (e.g., conventional 802.11 carrier sense) on the projected space. If no transmission is sensed in the projected space, the transmitter determines that it is able to transmit without interfering with other transmissions.

For example, a transmitter with N antennas can be thought of as being capable of transmitting in an N dimensional space. If the N antenna transmitter wants to transmit on a medium, it monitors the medium and determines the number, M, of concurrent transmissions already occurring on the medium. These transmissions occupy an M dimensional subspace. For each of the M transmissions already occurring on the medium, the transmitter loses the capability of transmitting on one of its dimensions.

If the number of transmissions, M, already occurring on the medium is less than the number of antennas on the transmitter, N, then the transmitter can transmit on the medium.

Note that even though the station may transmit in a manner that can be independent from the transmission already occurring, the receiver may not have enough antennas to distinguish the transmissions. In some examples, the station determines whether both it and the receiving stations each have a greater number of antennas than the number of independent transmissions (i.e., the dimension of the used subspace) already in progress.

In various examples, the transceiver may use one or multiple of a number of ways of monitoring the medium to determine the number of transmissions in progress. In some examples, the transceiver monitors the correlation of the signals received at its antennas with a known pattern. In other examples, the transmitter monitors the size of the subspace occupied by the signal using projection, without necessarily decoding the contents of the transmissions. Such a latter approach is compatible with detecting use of the medium by technologies that the transmitter cannot decode (e.g., the transmitter is a WiFi device where as the signal on the medium is from a baby monitor), or non-communication interference (e.g., a microwave oven). In some examples, the transceiver decodes at least a preamble of transmissions on the medium and determines the number of transmissions from that decoded information. In some examples, the transceiver detects "request to send" messages from the other transmitters and thereby knows that they are about to transmit. In some examples, the transceiver detects "clear to send" messages from receivers, thereby knowing characteristics of the signals they are about to receive (e.g., the dimensionality or number of streams of the signal they will be receiving.)

2 Receiver Feedback

In another aspect, in general, a station transmits information in a one-to-many manner providing a characterization of signals wanted from a particular transmitter and a characterization one or more (if any) unwanted signals being received from other transmitters. In some examples, this transmission of information is directed to a transmitter seeking to transmit to the station, for instance, in response to a "request to send" transmission to the station. Although this transmission is directed to a specific transmitter, it is also available to be monitored by other stations on the medium in a manner than the other stations can determine characteristics of their own transmissions that would be required to avoid interference at the other stations, for instance, using nulling or alignment techniques.

In some examples, the characterization of the wanted and the unwanted signals provides a characterization of a relationship between signals at the station's multiple antennas, and either explicitly and/or implicitly in the transmission provides information characterizing the channel between the station and a receiver of the information. One implicit way for characterizing the channel from the sender of the feedback to the receiver of feedback involves the receiver of the feedback using reciprocity which implies that the channel in one direction is the transpose of the channel in the reverse direction. In one example of how the feedback may be used, the transmitted feedback information is sufficient for a station receiving the information to adapt a transmission from its antennas such that when received at the station that provided the information such that the adapted transmission matches the relationship of the wanted transmissions, matches the relationship of the unwanted transmission (e.g., aligned to the unwanted transmissions), or is cancelled at the station (nulling).

In some examples, the characterization of the relationship between signals is represented by magnitude and phase differences between signals from pairs of antennas. These magnitude and phase differences may be represented as corresponding complex numbers. The relationship between signals at the antennas may be represented as complex vectors or a basis for a vector space of such complex vectors. In some examples, the relationship of wanted space is represented by a subspace that is orthogonal to a subspace representing the relationship of the unwanted signals. In some examples in which multiple communication frequencies are used (e.g., in an OFDM technology), the relationships are provided at each of the communication frequencies.

In some examples, the relationship may be represented as frequency or time domain transfer functions and/or impulse response, or other equivalent representations, which still providing the needed information.

In some examples, the station receives a "request to send" transmission from another station with that request including information offering a number of streams and/or specific available relationships between transmissions (e.g., known to the transmitter to avoid interference at current other receivers), and the relationship between the wanted signals identifies a relationship corresponding to the number of offered streams and/or a relationship that is consistent with the offered available relationships.

In various examples, the station may use one or multiple of a number of ways of monitoring the medium to determine the characteristics of the unwanted transmissions received at the station. In some examples, the station monitors the correlation of the signals received at its antennas without necessarily decoding the contents of the transmissions. Such an approach is compatible with detecting use of the medium by technologies that it cannot decode (e.g., a baby monitor), or non-communication interference (e.g., a microwave oven). In some examples, the station decodes at least a preamble of transmissions on the medium and determines characteristics from that decoded information. In some examples, the transceiver detects "request to send" messages from the other transmitters and thereby knows that they are about to transmit and characteristics of such transmissions. In some examples, the transceiver detects "clear to send" messages from receivers, thereby knowing characteristics of the signals they are about to receive.

3 Contention Mechanism

In another aspect, in general, a station adapts a transmission to a wanted receiver while one or more other transmitters transmit to one or more unwanted receivers on a shared medium. This adaptation is such that the transmissions of the one or more other transmitters are not interfered with at the unwanted receivers.

In some examples, the station has monitored transmissions from the unwanted receivers, which may include "clear to send" transmissions that characterize wanted and unwanted signals at those unwanted receivers, and uses those monitored transmissions to determine a suitable adaptation. In some examples, the station also makes use of a reciprocity principle to determine a channel characteristic between itself and the unwanted receivers. In some examples, this determining of a suitable adaptation includes determining whether to null its transmission or to align its transmission with unwanted signals at each of the unwanted receivers.

In some examples, determining the adaptation includes determining a relationship between signals transmitted at multiple antennas, for instance, as a subspace representation as discussed above.

In some examples, the determining of a suitable relationship between its signals is performed prior to offering the signal relationship to a wanted receiver in a request to send transmission, thereby ensuring that the wanted received identifies a suitable relationship in a clear to send transmission in return. In some examples, determining the suitable relationship is performed after receiving a clear to send transmission from the wanted receiver, and the adaptation of the transmission is performed to be consistent with the relationship of the wanted signals.

In some examples, the identification of a suitable subspace in which the station can transmit without interference at the unwanted receivers (i.e., by nulling and/or alignment) is used such that a random access contention scheme has its transmission limited to that subspace. In some examples, the wanted receiver provides further characterization its wanted transmissions to the station (e.g., in a clear to send transmission), but in general, this is not an essential aspect to the subspace contention mechanism.

In some examples, to transmit to the wanted receiver, the station first listens for a CTS from each of the unwanted receivers and from the wanted receiver. Based on the received CTS's, the station determines the number of transmissions already present on the medium. Based on this number, the transmitter determines how many dimensions it can offer to the wanted receiver for transmission. In some examples, the number of dimensions that it can offer is equal to the number of antennas included on the transmitter minus the number of transmissions already on the medium. The transmitter sends a request to send (RTS) to the wanted receiver, offering to transmit to the wanted receiver using all available dimensions. The wanted receiver responds with a CTS indicating to the transmitter the number of dimensions that the wanted receiver will accept as well as the subspace in which the transmitter should transmit.

In some examples, a transmitter shapes the transmitted signal (e.g., adapts a relationship between the signals at its antennas) to ensure it is delivered to the intended receivers without interfering with the reception of ongoing transmissions at their corresponding receivers using the following steps or a subset of them (in some order): 1) Using information about ongoing transmissions and their receivers' status, a new transmitter determines how to null or align its signal at the receivers of the ongoing transmissions such that it does not interfere with their reception of their wanted signals. 2) Using information about the ongoing transmissions and their receivers' status, the transmitter determines the number of independent signals or degrees of freedom that it can deliver to its own intended receivers. 3) Using information about the ongoing transmissions and their receivers' status the transmitter computes pre-coding vectors that it applies to its transmitted signal to ensure that it does not interfere with the reception of ongoing transmission at their corresponding receiver while enabling decodable reception at its own intended receivers.

4 Bit Rate Selection

In many conventional radio communication systems, a receiving station makes use of characteristics such as signal-to-noise ratio to provide feedback to a transmitter to determine a data rate suitable for the channel. For example, there may be a set of predefined data rates and the feedback is an index to a data rate suitable for the signal-to-noise ratio observed by the receiver.

In another aspect, in general, a receiving station provides feedback to a transmitter to determine a data rate suitable for transmission, but this feedback is coupled to an offer of a particular relationship (e.g., subspace) of its multiple antenna signals in which that data rate is feasible.

In some examples, a receiving station monitors unwanted transmission and determines a relationship between signals of a wanted transmission. For example, the station identifies a subspace that is orthogonal to a subspace of the unwanted transmissions and computes a function of the wanted signal after projection on this orthogonal subspace. The receiving station then provides the feedback about this function to the transmitter assuming that the transmitter will use this feedback to determine the bit rate of the wanted signals. One example of such function is the SNR of the wanted signal after projection, another example is a decodable transmission bit rate given the SNR after projection, a third example is an index into a table of modulation and error correcting codes.

In some examples, the unwanted transmissions are from another technology, and a projection approach is used without decoding the unwanted signal or knowing its exact channel coefficients, while in other examples, the unwanted transmissions are decoded at the receiving station.

In some examples, the data rate related information is provided in a clear to send transmission as described above so that the wanted transmitter knows both the desired relationship of the wanted signal as well as a data rate suitable for such relationship.

In some examples, to optimize the bit rate of the transmitter's transmission the receiver first determines the SNR of the projected wanted signal and maps the SNR to an optimal bit rate. The optimal bit rate is included in a CTS which is sent back to the transmitter where it is used to adjust the bit rate of transmitted data. In some examples, the receiver specifies which type of modulation or coding scheme the transmitter should use based on the SNR. In some examples, the SNR is sent back to the transmitter where the optimal bit rate is determined. In some examples, the receiver sends an index into a table to the transmitter and the transmitter determines the optimal bit rate by accessing the value at the specified index of the table.

5 Overall System

In another aspect, in general, the aspects 1-4 described above are combined into a random access protocol for MIMO networks which allows nodes that differ in the number of antennas to contend not just for time, but also for degrees of freedom provided by multiple antennas. In other aspects in general, any two or more of the aspects 1-4 are combined into a random access protocol for MIMO networks which allows nodes that differ in the number of antennas to contend not just for time, but also for degrees of freedom provided by multiple antennas.

In some examples, the overall system is compatible with conventional systems, such as 802.11, by using a conventional approach for carrier sense random access for the first transmission on the medium. A second or subsequent potential transmission makes use of the RTS and CTS mechanism described above. For example, the second transmitter sends a RTS to a second receiver. As long as that second receiver is configured to respond with a CTS, the stations communicating using the conventional approach are not affected—the existing transmission continues, and other conventional transmitters do not transmit because they sense the ongoing transmission(s). But each additional transmitter using the new approach effectively restricts its transmissions to non-interfering subspaces based on the feedback from the receivers and/or tracking of channel characteristics to conventional receivers (e.g., using reciprocity approaches) that do not provide explicit feedback.

Experimental results using these approaches show the following:

On average, the total network throughput doubles when the nodes use aspects described above, as opposed to current 802.11n.

Nodes with multiple antennas achieve significant throughput gains, and the gains increase with increased number of antennas. Specifically, the 2-antenna pair experiences an average throughput gain of 1.5×, and the 3-antenna pair experiences an average throughput gain of 3.5×.

There are three reasons for these throughput gains. First, the aspects described above allow the nodes to transmit three streams at any point in time, providing a multiplexing gain. Second, in 802.11n, each transmitter is given an equal chance to transmit a packet. Thus, nodes that have low throughput occupy more time on the medium than nodes with high throughput. Since single-antenna nodes typically have lower throughput as compared to multi-antenna nodes, which can transmit concurrent streams, the network throughput of existing 802.11n is bottlenecked by single-antenna nodes. In contrast, in the aspects described above, since multi-antenna transmitters can join the ongoing transmission of single-antenna nodes, it does not matter that the single-antenna nodes take too much time on the medium. Third, allowing multiple nodes to transmit simultaneously provides a power gain. In particular, the FCC limits the maximum transmission power of a single transmitter. Hence, 802.11n is limited by the amount of power on any single transmitter. In contrast, having multiple nodes transmit simultaneously (as in the aspects described above) increases the total power on the medium, which increases the capacity of the system.

The reduction in throughput at the single-antenna node is less than 3%. This number is fairly small because the residual interference after nulling is 0.8 dB (as shown above), which has a negligible impact on throughput.

While the residual interference after alignment is slightly higher than nulling (1.3 dB), it does not translate to a throughput loss. This is because the 2-antenna receiver, where alignment occurs, gains more from concurrent transmissions than the small loss due to alignment errors.

Other features and advantages of the invention are apparent from the following description, and from the claims.

DESCRIPTION

Figure 1:
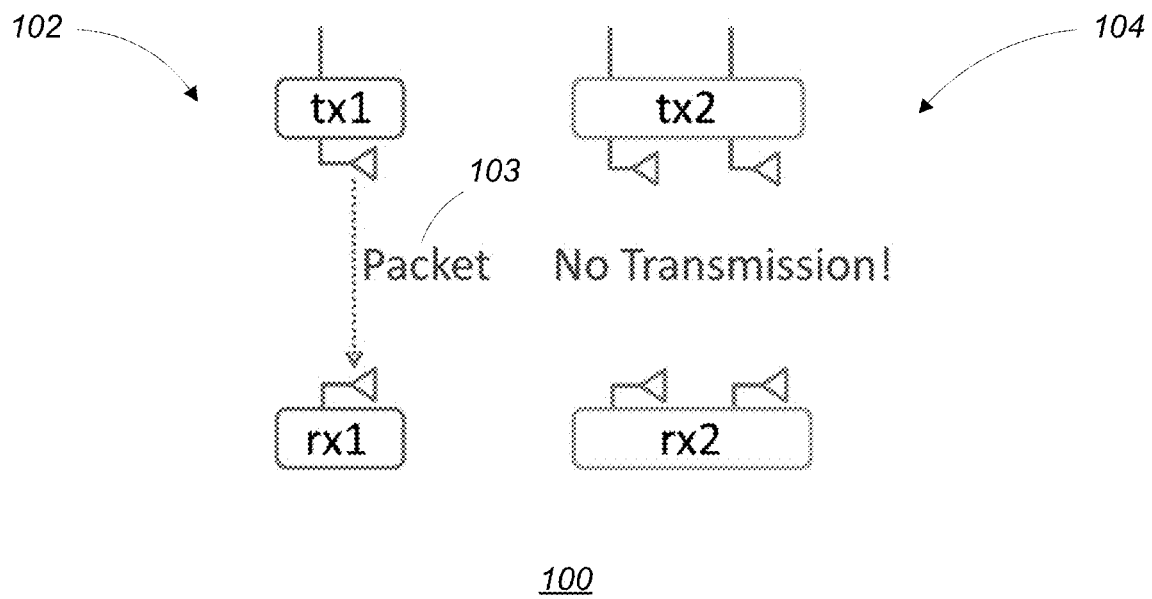
FIG. 1 is a conventional 802.11n wireless MIMO network.
Figure 2:
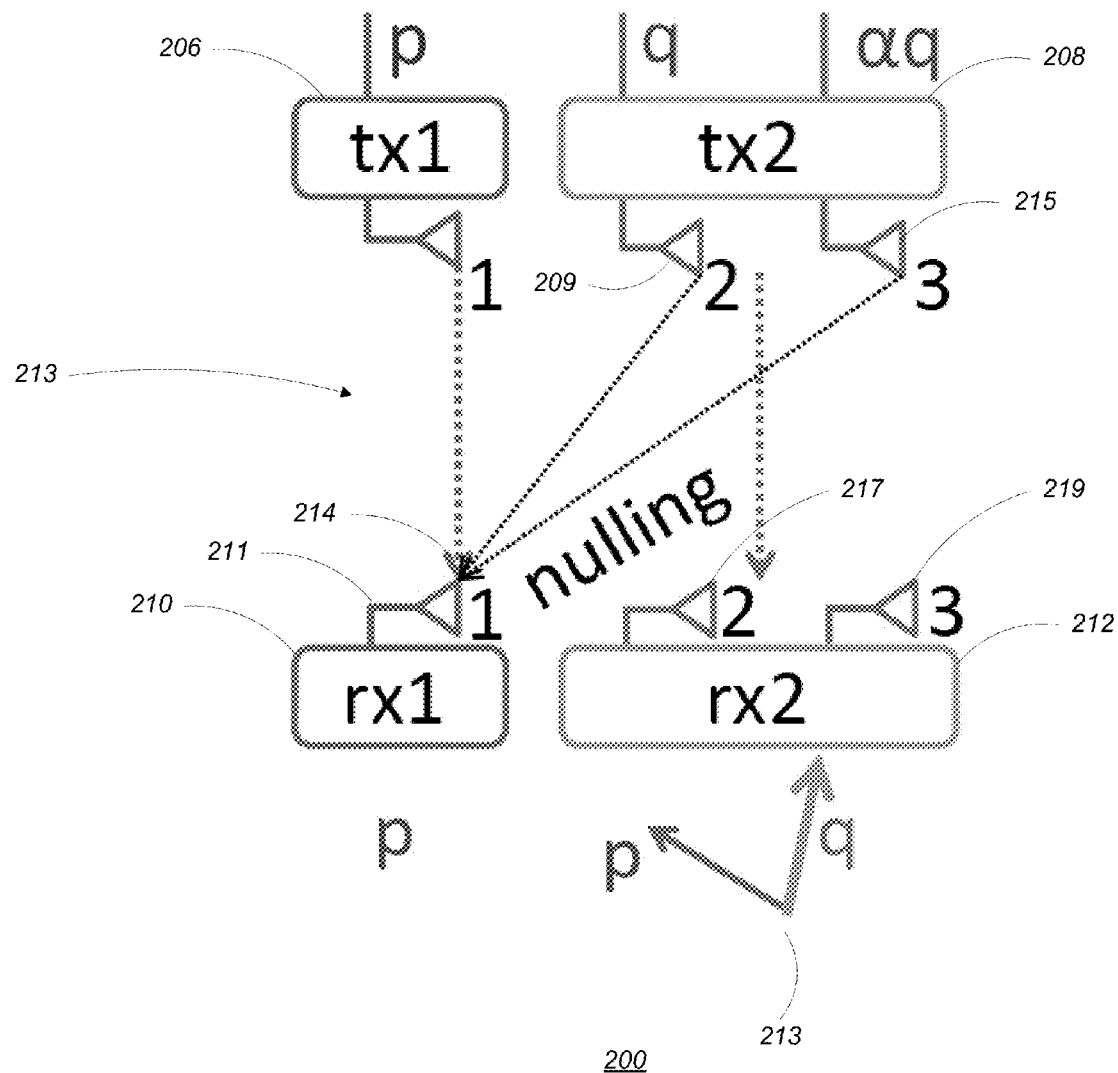
FIG. 2 is a wireless MIMO network configured to perform interference nulling.

Referring to FIG. 2, in an illustrative example of a network with two transmitting stations (tx1 206 and tx2 208) and two receiving stations (rx1 210 and rx2 212), tx1 206 wants to communicate with rx1 210, and tx2 208 wants to communicate with rx2 212. To do so, a MAC protocol is designed which allows the network to use all available degrees of freedom.

In the example of FIG. 2, one challenge is transmitting from tx2 208 without interfering with the ongoing reception at rx1 210. To do this, a MIMO technique referred to as interference nulling is leveraged. In interference nulling, the signal transmitted by tx2 208 creates a null 214 at the antenna 211 of rx1 210.

Given the channel coefficients, $h_{ij}$, from the $i^{th}$ antenna at the transmitters 206, 208 to the $j^{th}$ antenna at the receivers 210, 212, to create a null at rx1 210, for every symbol q transmitted, tx2 208 transmits q on the first antenna 209 and αq on the second antenna 215. The signals from tx2's antennas 209, 215 combine on the medium 213, and rx1 210 receives $(h_{21}+\alpha h_{31})q$. By choosing α to be $$-\frac{h_{21}}{h_{31}},$$

tx2 208 ensures that the signals from its two antennas 209, 215 cancel each other at rx1's antenna 211, and hence do not create any interference at rx1 210.

Note that nulling at rx1 210 does not prevent tx2 208 from delivering its packet to its own receiver rx2 212. In particular, say tx1 206 is transmitting the symbol p and tx2 208 is transmitting the symbol q. Intuitively, since rx2 212 has two antennas 217, 219, the received signal exists in a 2-dimensional space. In this space, the two symbols p and q lie along two different directions, as shown in the bottom graph 213 in FIG. 2. Thus, to decode its desired symbol, q, rx2 212 projects on a direction orthogonal to p, which is interference-free from the symbol, p.

The above intuition can be formalized as follows where rx2 receives the following signals on its two antennas:

$$y_2 = h_{12}p + (h_{22}+h_{32}\alpha)q \tag{1}$$

$$y_3 = h_{13}p + (h_{23}+h_{33}\alpha)q \tag{2}$$

If rx2 212 knows the channel terms from tx1 206 and tx2 208 (which it can compute from the preamble in their packets), it can solve the above two equations for the two unknowns p and q, and obtain its desired symbol, q.

The above discussion assumes that tx2 208 knows the channel from itself to rx1 210 so that it can compute the value of α. The naive way to do this would have tx2 208 and rx1 210 coordinate and exchange channel information before tx1 206 starts transmitting. Such a solution, however, requires tx1-rx1 to worry about which node pair may later join their transmission and coordinate with that pair to prevent interference. Fortunately, this is not necessary. To enable channel estimation in a distributed way, the system 200 makes a communicating pair precede its data exchange with a light-weight handshake, operationally similar to RTS-CTS but significantly more efficient. A transmitter that wants to join the ongoing transmissions exploits the handshake messages of prior contention winners to compute the reverse channels from itself to receivers of ongoing transmissions, using channel reciprocity. Reciprocity states that electromagnetic waves travel forward and backward the same way and hence the channel observed between any two antennas should be the same regardless of the direction. Reciprocity has been confirmed empirically.

The above MAC protocol allows the network to achieve two degrees of freedom at any point in time, which is the maximum number of degrees of freedom available in this network. The design described above can be extended with some non-trivial features to more than two transmission pairs.

Figure 3:
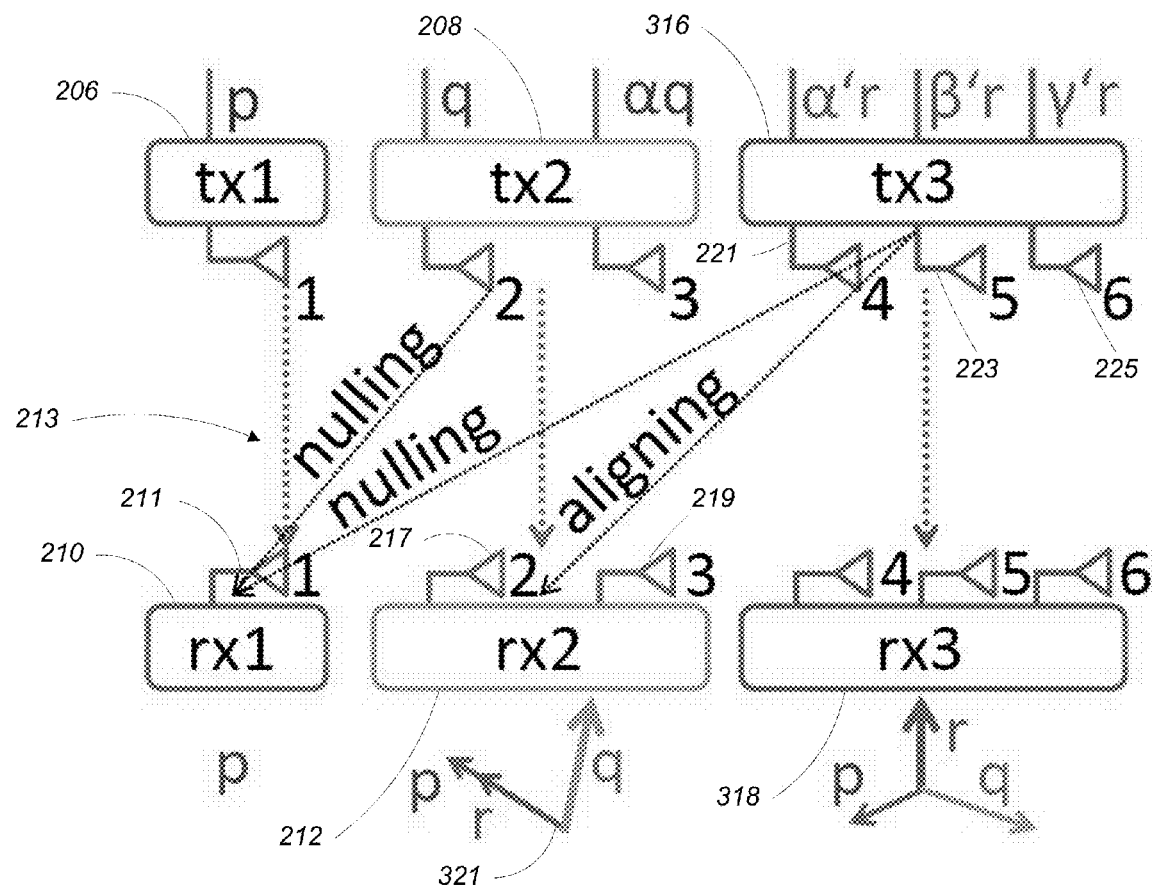
FIG. 3 is a wireless MIMO network configured to perform interference nulling and alignment.

Referring to FIG. 3, a network 300 includes a third communicating pair, tx3 316 and rx3 318 and illustrates why the design described above does not trivially extend to more than two transmission pairs. The new pair is a 3-antenna system and hence can support three degrees of freedom. This means that tx3 316 should be able to transmit an additional packet to rx3 318, concurrent to the two transmissions of tx1 206 to rx1 210 and tx2 208 to rx2 212. The transmitter tx3 316, however, is in a more challenging position, because it is constrained to interfere with neither rx1 210 nor rx2 212.

To ensure that tx3 316 does not create any interference at rx1 210 and rx2 212, tx3 316 needs to null its signal at three antennas, the antenna 211 at rx1 210 and the two antennas 217, 219 at rx2 212. However, nulling at three antennas prevents tx3 316 from sending any data. To see why this is the case, let tx3 316 transmit its packet r on its three antennas, after multiplying it with α', β' and γ', respectively. Let $h_{ij}$ be the channel coefficients between antennas i=4, 5, 6 on tx3 316 and antennas j=1, 2, 3 on rx1 210 and rx2 212 where tx3 316 performs nulling. The signals from tx3's antennas 221, 223, 225 combine on the medium 213, creating a different equation at each receive antenna. Nulling the signal at rx1's antenna 211 and rx2's two antennas 217, 219 can be expressed as follows:

$$r(h_{41}\alpha' + h_{51}\beta' + h_{61}\gamma') = 0 \tag{3}$$

$$r(h_{42}\alpha' + h_{52}\beta' + h_{62}\gamma') = 0 \tag{4}$$

$$r(h_{43}\alpha' + h_{53}\beta' + h_{63}\gamma') = 0 \tag{5}$$

where r is tx3's symbol and $h_{ij}$ are the channel coefficients.

The above three equations are satisfied for any value of the transmitted symbol, r, if and only if (α', β', γ')=(0, 0, 0). This solution, however, is clearly unacceptable because it prevents tx3 316 from transmitting any signal from any of its antennas to its receiver 318. Therefore, interference nulling alone is not sufficient to prevent tx3 316 from interfering with concurrent transmissions while delivering a packet to its receiver.

Thus, for tx3 316 to both deliver a packet to its receiver and prevent interfering with concurrent transmissions, tx3 316 uses a combination of interference nulling and interference alignment. To eliminate interference at the single antenna at rx1 210, tx3 316 still uses interference nulling. This constraint requires tx3 316 to satisfy only one additional equation, equation 3. To eliminate interference at the 2-antenna receiver rx2 212, tx3 316 uses interference alignment. This constraint requires satisfying only one additional equation, as opposed to the two equations required for nulling at the two antennas at rx2 212. Specifically, tx3 316 can align its signal at rx2 212 with the interference that rx2 212 already receives from the first transmitter, tx1 206, as shown in the graph 320 below rx2 212. Then, rx2 212 only sees two signals, the symbol q transmitted by tx2 208 and the combined interference from tx1 206 and tx3 316, since the two signals from tx1 206 and tx3 316 are aligned and appear to be coming from a single interferer. Specifically, the signals received by rx2 212 are can be represented as:

$$y_2 = h_{12}p + (h_{22}+\alpha h_{32})q + (\alpha' h_{42} + \beta' h_{52} + \gamma' h_{62})r \tag{6}$$

$$y_3 = h_{13}p + (h_{23}+\alpha h_{33})q + (\alpha' h_{43} + \beta' h_{53} + \gamma' h_{63})r, \tag{7}$$

and hence aligning the interference from tx1 206 and tx3 316 requires tx3 316 to satisfy the following equation:

$$\frac{(\alpha' h_{42} + \beta' h_{52} + \gamma' h_{62})}{h_{12}} = \frac{(\alpha' h_{43} + \beta' h_{53} + \gamma' h_{63})}{h_{13}} = L, \tag{8}$$

where L is any constant. If tx3 316 chooses the parameters α", β', and γ' to satisfy equation 8, equations 6 and 7 can be rewritten as:

$$y_2 = h_{12}(p+Lr) + (h_{22}+\alpha h_{32})q$$

$$y_3 = h_{13}(p+Lr) + (h_{23}+\alpha h_{33})q.$$

The receiver, rx2 212, now has two independent equations and two unknowns, (p+Lr) and q, and hence can decode its desired symbol q. (Note that rx2 212 cannot decode p and r separately. However, this is inconsequential since rx2 212 does not want these symbols.)

Thus, in total, tx3 316 has to satisfy two equations to ensure that it does not interfere with the ongoing transmissions: the nulling equation (equation 3) at rx1 206 and the alignment equation (equation 8) at rx2 212. Then, tx3 316 uses its remaining, third degree of freedom to transmit to its own receiver, rx3 318.

Additional transmitter-receiver pairs can be added to the network 300 as long as they have additional antennas. By nulling at the first receiver and aligning at all the remaining receivers, each additional transmitter can transmit to its own receiver while ensuring no interference to ongoing transmissions.

Figure 4:
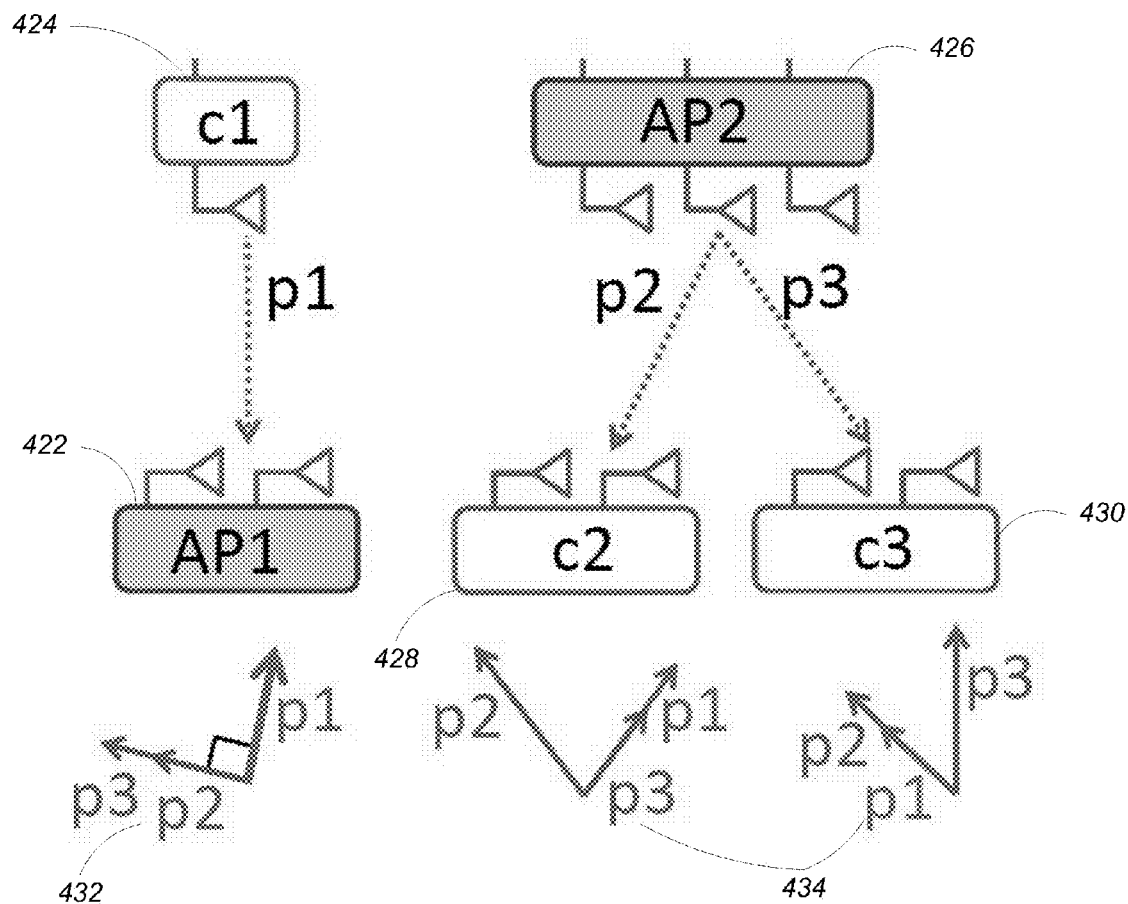
FIG. 4 is a heterogeneous wireless MIMO network.

Referring to FIG. 4, the concepts described above also generalize to scenarios where a transmitter and its receivers have different numbers of antennas. For example, the network 400 of FIG. 4 includes a 2-antenna access point, AP1 422, transmitting to a single-antenna client, c1 424, and a 3-antenna access point, AP2 426, transmitting to two 2-antenna clients, c2 428 and c3 430. In current, conventional networks, the transmission between AP1 422 and c1 424 prevents any other node from transmitting concurrently. However, with the system described herein, AP2 426 can transmit two packets concurrently, one to each of its clients 428, 430, i.e., $p_2$ to client c2 428 and $p_3$ to client c3 430.

To transmit these two packets while protecting the ongoing reception at c1 424, AP2 426 must ensure that both of its transmitted packets ($p_2$ and $p_3$) are received at the AP1 422 along a direction orthogonal to the signal of interest to that AP, i.e., the signal from c1, $p_1$. This allows AP1 422 to continue to receive its client's signal without interference, as shown in the graph 432 below AP1 422. AP2 426 also needs to ensure that its transmission to one client does not create interference at the other client. Since each of its clients 428, 430 has two antennas and hence receives signals in a 2-dimensional space, this goal can be achieved if AP2 426 ensures that each client receives the unwanted signal aligned along the interference it already sees from the ongoing transmission of c1 424, (i.e., along $p_1$ as is shown in the graphs 434 below c2 428 and c3 430).

As is described above, the random access protocol described herein enables nodes with any number of antennas to contend for both time and degrees of freedom. It also has bitrate selection built-in.

Similar to 802.11, nodes operating under the random access protocol listen on the wireless medium using an extended version of carrier sense. If the channel is unoccupied, the nodes contend for the medium using 802.11's contention window and random backoff. The node pair that wins the contention exchanges a light-weight RTS-CTS. The RTS-CTS allows nodes interested in contending for the remaining degrees of freedom to compute the channels to the receivers who won earlier contentions, in order to perform the required alignment or nulling. The RTS-CTS also includes the number of antennas that will be used in the transmission. After the RTS-CTS, the node pair proceeds to exchange the data packet followed by the ACK.

Unlike 802.11, the random access protocol includes a contention mechanism which allows nodes who have more antennas than the current number of used degrees of freedom to contend for concurrent transmissions. The number of used degrees of freedom is equal to the number of ongoing transmissions, which a node can learn from prior RTS-CTS messages. As nodes contend for the unused degrees of freedom, they again use a contention window and random backoff similar to 802.11. However, while carrier sensing, nodes need to ignore the signals from past contention winners. To do so, the random access protocol leverages that multi-antenna nodes receive the signal in a multi-dimensional space and, thus, can project on a space orthogonal to ongoing transmissions from past contention winners. Due to orthogonality, this space does not contain any interference from the ongoing transmissions, and thus, allows the nodes to perform carrier sense as if there were no ongoing transmissions. The process continues until all the degrees of freedom in the network have been used.

Again referring to FIG. 3 a network 300 includes three transmitter-receiver pairs. Each of the three transmitters carrier senses the medium and contends for the channel. Depending on which pair wins the contention, four different scenarios are possible.

Figure 5:
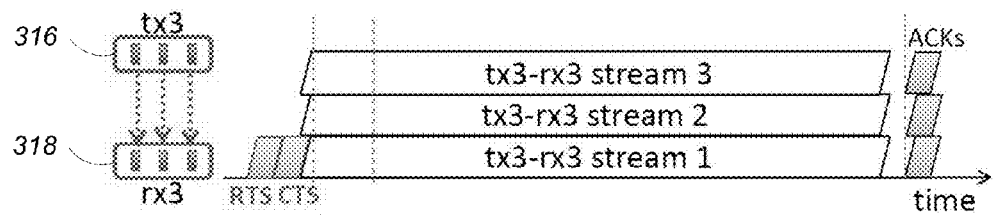
FIGS. 5-8 illustrate four data transmission scenarios for the network of FIG. 3.

Referring to FIGS. 3 and 5, in a first scenario, the 3-antenna pair, tx3-rx3, wins the contention and communicates using all three degrees of freedom. In this case, tx3 316 and rx3 318 exchange RTS-CTS, informing other nodes that they will use three degrees of freedom in their transmission. Since the other two transmitters have fewer than three antennas, they cannot support any additional degrees of freedom, and hence stop contending until the end of this transmission.

Figure 6:
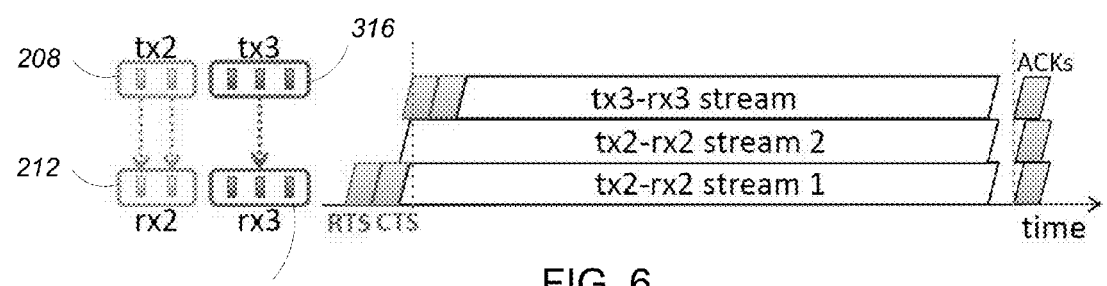

Referring to FIGS. 3 and 6, in a second scenario, the two-antenna pair, tx2-rx2, wins the contention and uses two degrees of freedom. The first transmitter, tx1 206, detects that the channel is occupied and drops out of contention since it has only a single antenna. The third transmitter, tx3 316, on the other hand, has three antennas and therefore can deliver an additional packet. So it contends for the medium and wins the third degree of freedom. Since tx3 316 must not interfere with the ongoing transmission of tx2-rx2, it nulls its signal on the two antennas at rx2 212. This consumes two antennas at tx3 316, leaving it one antenna to transmit one stream to its own receiver, rx3 318.

Figure 7:
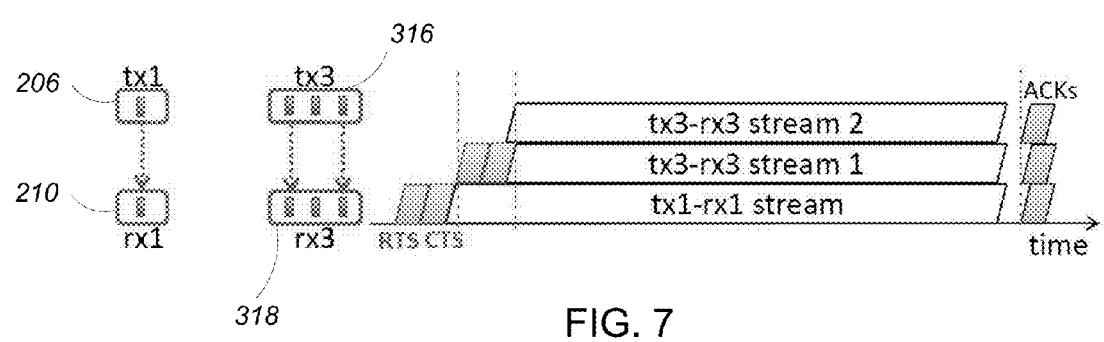

Referring to FIGS. 3 and 7, in a third scenario the tx1-rx1 pair wins the contention. Since only a single degree of freedom is used, both tx2 208 and tx3 316 contend for the remaining two degrees of freedom. If tx3 316 wins, it needs to use one of its antennas to null its signal at rx1 210, which leaves it two antennas to send two concurrent streams to its own receiver, rx3 318.

Figure 8:
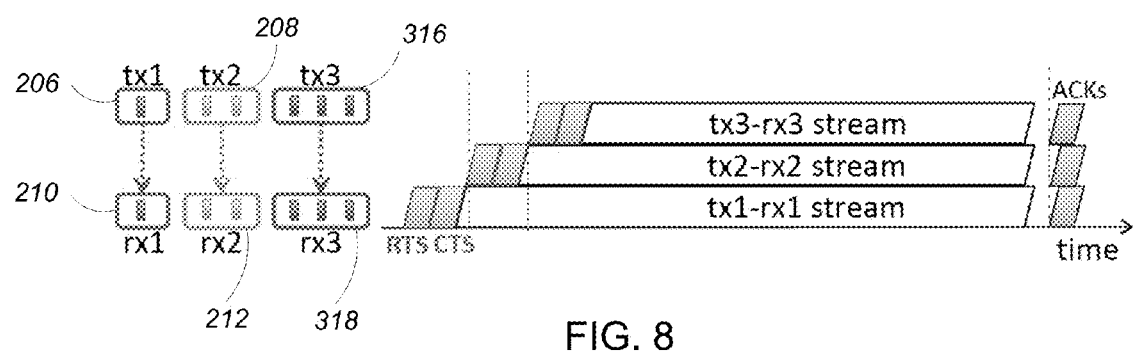

Referring to FIGS. 3 and 8, in a fourth scenario, the nodes win contention in the following order: tx1-rx1, tx2-rx2, tx3-rx3. In this scenario, each transmitter-receiver pair ends up transmitting a single packet.

It is noted that the random access protocol makes a node that joins ongoing transmissions end its transmission at about the same time as prior transmissions, which it learns from their light-weight RTS-CTS exchange. This design choice forces the medium to become idle at the end of each joint transmission, and hence prevents starving nodes that have only one antenna. Requiring all nodes to end their concurrent transmissions with the first contention winner means that nodes may need to fragment or aggregate packets. Various link layer protocols require packet fragmentation or aggregation. For example, 802.11n requires the driver to be able to aggregate multiple packets to create an aggregate frame, whereas old ATM networks require packet fragmentation. The random access protocol leverages these methods.

Furthermore, instead of sending the ACKs one after the other, the receivers transmit their ACKs concurrently. These concurrent transmissions are analogous to the concurrent transmissions of the data packets, and can be achieved using a combination of nulling and alignment.

As is described above, in the random access protocol, nodes use an extended version of 802.11's carrier sense to contend for additional concurrent transmissions, even after some nodes have already won earlier contention rounds and started their transmissions. For this approach to work effectively, carrier sense should be oblivious to the ongoing transmissions. The random access protocol satisfies this constraint as follows: In the random access protocol, a node that is interested in sensing the medium first computes the channel for the ongoing transmissions (which it does using the preamble in their RTS messages). These channels define a subspace where the ongoing transmissions reside. If the node projects on a space orthogonal to this subspace, the node will see no signal from ongoing transmissions, and hence can perform standard 802.11 carrier sense. This approach is referred to as multi-dimensional carrier sense.

Referring again to FIG. 3, a network 300 includes three pairs of nodes: a single-antenna pair tx1-rx1, a 2-antenna pair tx2-rx2, and a 3-antenna pair tx3-rx3.

Figure 9:
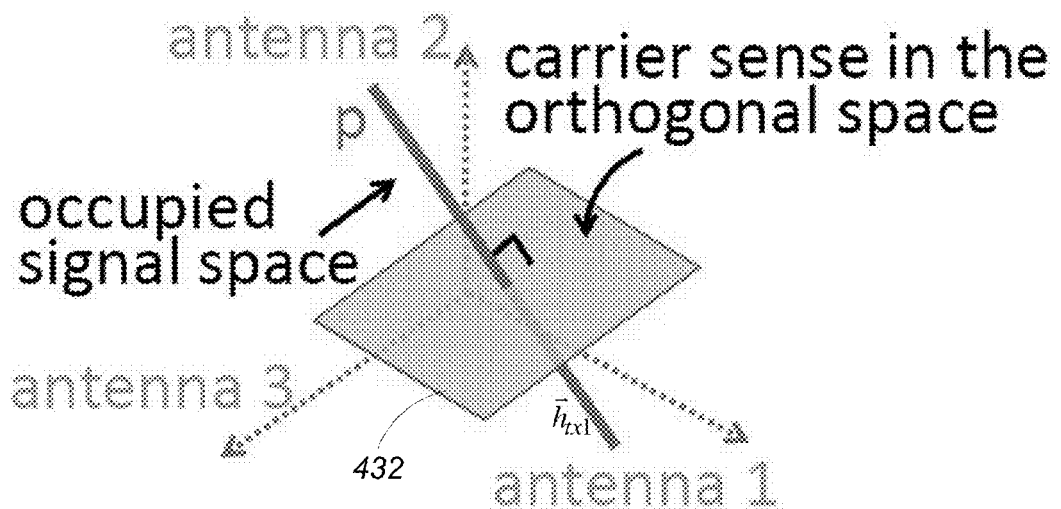
FIG. 9 illustrates a transmission space for a three antenna access point including the presence of a single transmitting signal.

If the single-antenna transmitter, tx1 206, wins the first round of contention, it begins transmitting some signal p, using the first degree of freedom. If tx3 316 then wants to contend for the second degree of freedom, tx3 316 should sense the medium, but ignore the signal p from tx1 206. To do so, tx3 316 first computes the channel from tx1 206 to its three antennas using the preamble in tx1's RTS. The computed channels are referred to as $h_1$, $h_2$, and $h_3$. Since tx3 316 has three antennas, the received signal lies in a 3-dimensional space and can be written as:

$$\vec{y} = \begin{pmatrix} y_1 \\ y_2 \\ y_3 \end{pmatrix} = \begin{pmatrix} h_1 \\ h_2 \\ h_3 \end{pmatrix} p = \vec{h}_{tx1} p,$$

where $\vec{h}_{tx1}$ is the channel vector $[h_1, h_2, h_3]^T$. Thus, for different symbols p transmitted by tx1 206, the received signal at tx3 316 changes over time, but merely moves along the one-dimensional vector $\vec{h}_{tx1}$, shown in FIG. 9. Therefore, by projecting on the 2-dimensional subspace orthogonal to this vector, (the plane 950 in FIG. 9), tx3 316 eliminates interference from tx1 206 and is able to carrier sense for the remaining degrees of freedom. Since a 2-dimensional subspace is defined by any two distinct vectors in it, tx3 316 can project on the subspace orthogonal to p by simply picking any two vectors in the subspace, e.g., $\vec{w}_1$ and $\vec{w}_2$, and projecting on them to get:

$$\vec{y}' = \begin{pmatrix} \vec{w}_1 \cdot \vec{y} \\ \vec{w}_2 \cdot \vec{y} \end{pmatrix},$$

where • denotes the dot product operation. If tx1's signal, p, is the only ongoing transmission, then $\vec{y} = \vec{h}_{tx1} p$, and by definition of orthogonality, $\vec{y}' = \vec{0}$. Thus, if tx3 316 performs carrier sense by sensing the signal after projection, $\vec{y}'$, it sees that the second degree of freedom is still unoccupied.

Now, say transmitter tx2 208 wins the second degree of freedom and starts transmitting its signal, q. Let $h'_1$, $h'_2$, and $h'_3$ be the channels from tx2 208 to tx3 316. The three antennas at tx3 316 now receive the following combined signal from tx1 206 and tx2 208:

$$\vec{y} = \begin{pmatrix} y_1 \\ y_2 \\ y_3 \end{pmatrix} = \begin{pmatrix} h_1 \\ h_2 \\ h_3 \end{pmatrix} p + \begin{pmatrix} h'_1 \\ h'_2 \\ h'_3 \end{pmatrix} q = \vec{h}_{tx1} p + \vec{h}_{tx2} q,$$

where $\vec{h}_{tx2}$ is the channel vector for the second transmission. However, since tx3 316 is carrier sensing in the 2-dimensional space orthogonal to tx1's transmission, it computes:

$$\vec{y}' = \begin{pmatrix} \vec{w}_1 \cdot \vec{y} \\ \vec{w}_2 \cdot \vec{y} \end{pmatrix} = \begin{pmatrix} \vec{w}_1 \cdot \vec{h}_{tx1} p + \vec{w}_1 \cdot \vec{h}_{tx2} q \\ \vec{w}_2 \cdot \vec{h}_{tx1} p + \vec{w}_2 \cdot \vec{h}_{tx2} q \end{pmatrix} = \begin{pmatrix} \vec{w}_1 \cdot \vec{h}_{tx2} \\ \vec{w}_2 \cdot \vec{h}_{tx2} \end{pmatrix} q.$$

Thus, as opposed to the scenario in which only tx1 206 was transmitting and tx3 316 saw that the second degree of freedom is unused, tx3 316 sees that now $\vec{y}' \neq \vec{0}$, and hence the second degree of freedom is occupied.

Figure 10:
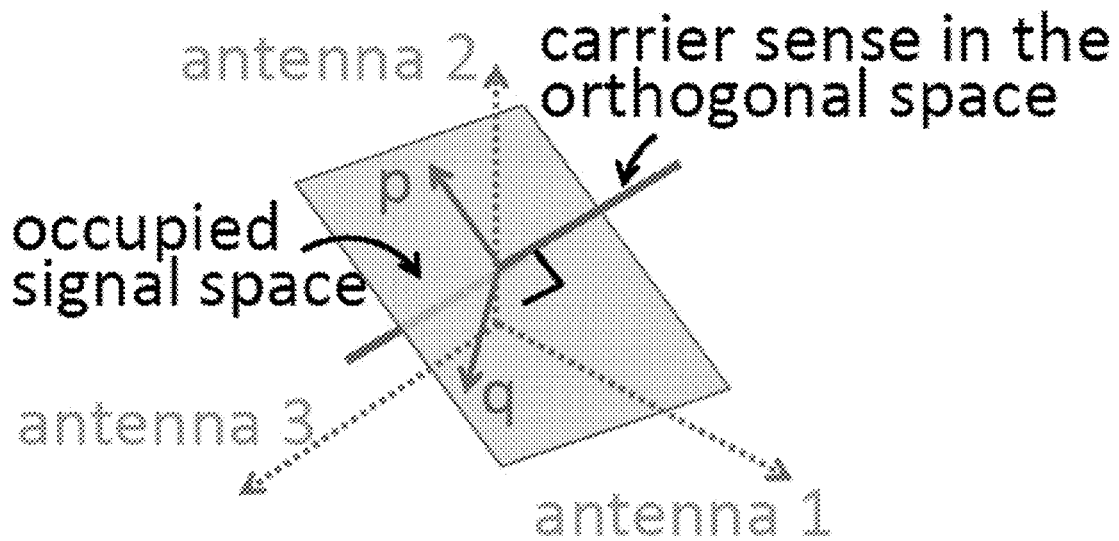
FIG. 10 illustrates a transmission space for a three antenna access point including the presence of two transmitting signals.

Further, since the signal $\vec{y}'$ has no interference from tx1 206, and is equal to tx2's transmission, q, with a channel multiplier, tx3 316 can decode q using standard decoders. This allows tx3 316 to carrier sense not only by checking the power on the medium but also by cross correlating the preamble as in today's 802.11.

tx3 316 can use the same process to carrier sense and contend for the third degree of freedom. The only difference is that it has to project on a space orthogonal to both tx1's and tx2's signals, as shown in FIG. 10. Thus, to summarize, for any number of concurrent transmissions the signal lives in a hyper-plane of the same dimension as the number of used degrees of freedom. To sense the medium, the node projects on the space orthogonal to the ongoing signals' hyper-plane, and performs carrier sense in this space.

In the random access protocol, nodes that want to transmit in the presence of ongoing transmissions have to ensure that they do not interfere with those who already occupy the medium. This applies to the transmission of RTS, CTS, data, and ACK packets. In all of these cases, the approach is the same as is described above and relies on a combination of interference nulling and alignment. It is helpful to explain the approach in the context of packets. However, it is noted that the approach is not limited to packets.

The following section illustrates the protocol for transmitting with concurrent transmissions. First, the following definitions are made:

Definitions: Consider a scenario where there are K concurrent streams (i.e., K transmissions) on the medium. Let tx be an M-antenna transmitter that wants to transmit in the presence of the ongoing streams. Let m be the maximum number of concurrent streams that tx can transmit without interfering with the ongoing streams. For each stream that tx transmits, $s_i$, tx sends $\vec{v}_i s_i$, where $\vec{v}_i$ is an M-element pre-coding vector and each element $v_{ij}$ describes the scaling factor for stream $s_i$ transmitted from antenna j. Thus, the signal that tx transmits can be expressed as $\Sigma_1^m s_i \vec{v}_i$.

Let $\mathcal{R}$ be the set of receivers of the ongoing streams, and $\mathcal{R}'$ be the set of receivers of tx. Each receiver, rx, is interested in decoding the streams destined to itself, which are referred to as the wanted streams. An N-antenna receiver, rx, that wants n≤N streams receives signals in an N-dimensional space, a subset of which is wanted and the rest is the unwanted space. The matrix U is used to represent the unwanted space and $U^\perp$ to represent the space orthogonal to U.

Based on the above definitions, the protocol is defined as with the goal of computing the pre-coding vectors such that a transmitter delivers its streams to its receivers without interfering with any of the ongoing streams. The protocol proceeds in three steps as follows:

Step 1: It is first decided whether to align or null at a particular receiver. In general, if the receiver has an unwanted space (i.e., N>n), it does not hurt to align the new interference in the unwanted space. However, if wanted streams occupy the whole N-dimensional space in which the receiver receives signals, the transmitter has to null its interference at the receiver. Thus, to avoid interfering with the n wanted streams at an N-antenna receiver, rx, the transmitter nulls all of its streams at rx if n=N, and aligns its streams in rx's unwanted space, otherwise.

Step 2: The maximum number of concurrent streams that the transmitter can transmit is then computed. In general, a transmitter with M antennas can transmit as many as m=M−K different streams concurrently without interfering with the ongoing K streams.

This can be proved by leveraging the fact that a transmitter can null its signal at an N-antenna receiver with n wanted streams (where n=N) by satisfying:

$$\forall i=1,\ldots,m, H_{N\times M}\vec{v}_i = \vec{0}_{n\times 1}, \quad (9)$$

where $H_{N\times M}$ is the channel matrix from tx to rx and by leveraging the fact that a transmitter can align its signal in the unwanted space, U, of an N-antenna receiver with n wanted streams by satisfying:

$$\forall i=1,\ldots,m, U_{n\times N}^\perp H_{N\times M}\vec{v}_i = \vec{0}_{n\times 1}, \quad (10)$$

where $H_{N\times M}$ is the channel matrix from tx to rx.

The above equations articulate the linear equations that the transmitter's pre-coding vectors must satisfy. Equations 9 and 10 show that, independent of nulling or alignment, a receiver $rx_j \in \mathcal{R}$ that wants $n_j$ streams results in a matrix equation of $n_j$ rows. Hence, the transmitter's pre-coding vectors have to satisfy a total number of linear equations equal to $\Sigma n_j$, where the sum is taken over the receivers in $\mathcal{R}$. This sum is simply the total number of ongoing streams K. Further, these equations are independent because of the independence of the channel matrices, the H's. Given that the transmitter has M antennas and its pre-coding vectors have to satisfy K independent linear equations, there are exactly M−K linearly independent such vectors. Thus, the number of different streams that the transmitter can send is m=M−K.

Step 3: The pre-coding vectors are then computed by the transmitter. If the transmitter has a single receiver, this task is fairly simple. The transmitter combines the various nulling and alignment equations into one matrix equation as follows:

$$[H_1^T H_2^T \ldots (U_j^\perp H_j)^T \ldots]^T \vec{v} = \vec{0},$$

where $[.]^T$ is the matrix transpose. The solutions to this equation are the basis vectors of the null space of the matrix. Since the matrix dimensions are K×M, there are M−K such vectors.

If the transmitter, however has multiple receivers, as in FIG. 3, it needs to ensure that a stream that it sends to one receiver does not interfere with a stream that it sends to another receiver. For example, in FIG. 3, AP2 426 has to align the stream sent to each client in the unwanted space of the other client. This process however is similar to aligning at the receivers of ongoing streams as is described above. Specifically, given stream i is destined to receiver $rx \in \mathcal{R}'$. For every receiver $rx_j \in \mathcal{R}'$, different from rx, and whose unwanted space is $U'_j$, the transmitter needs to ensure that $U'^\perp_j H'_j \vec{v}_i = \vec{0}$. Note that constraints for nulling or aligning at the receivers of ongoing streams are shared among all of the transmitter's streams, whereas the constraints for nulling/aligning at the transmitter's other receivers differ across the transmitter's streams depending on the receiver of each stream. Combining all these constraints, the transmitter can compute its pre-coding vectors as follows:

Let $U_{n\times N}^\perp$ be the space orthogonal to the unwanted space at an N-antenna receiver, rx. For a receiver where the unwanted space is null, i.e., n=N, $U^\perp$ becomes the identity matrix, I. An M-antenna transmitter that wants to transmit m streams to receivers in $\mathcal{R}'$, while avoiding interference with receivers in $\mathcal{R}$, has to pick its coding vectors to satisfy:

$$\begin{pmatrix} U_1^\perp H_1 \\ \vdots \\ U_{|\mathcal{R}|}^\perp H_{|\mathcal{R}|} \\ ---- \\ U'^\perp_1 H'_1 \\ \vdots \\ U'^\perp_{|\mathcal{R}'|} H'_{|\mathcal{R}'|} \end{pmatrix}_{M\times M} [\vec{v}_1 \ldots \vec{v}_m]_{M\times m} = \begin{pmatrix} 0 \ldots 0 \\ \ddots \\ 0 \ldots 0 \\ --- \\ I \end{pmatrix}_{M\times m}, \quad (11)$$

where |.| is the cardinality of the set.

The proof follows directly from the discussion above. Thus, the transmitter uses equation 11 to compute the pre-coding vectors. To do so, the transmitter needs the channel matrices, H, which it obtains using reciprocity, and the alignment matrices, $U^\perp$, which are in the receivers' CTS messages. Once the transmitter has the pre-coding vectors, it transmits its signal $\Sigma_1^m s_i \vec{v}_i$, which does not interfere with the wanted streams of any receiver.

The random access protocol also includes a mechanism for choosing the best bitrate (i.e., bitrate selection) for a transmitter in the presence of ongoing transmissions. In general, bitrate selection has to be done on a per-packet basis since different packets share the channel with different sets of transmitters and hence require different bitrates. This constraint differs from the standard assumptions made by conventional bitrate selection algorithms, which use historical performance to predict the best bitrate.

Figure 11:
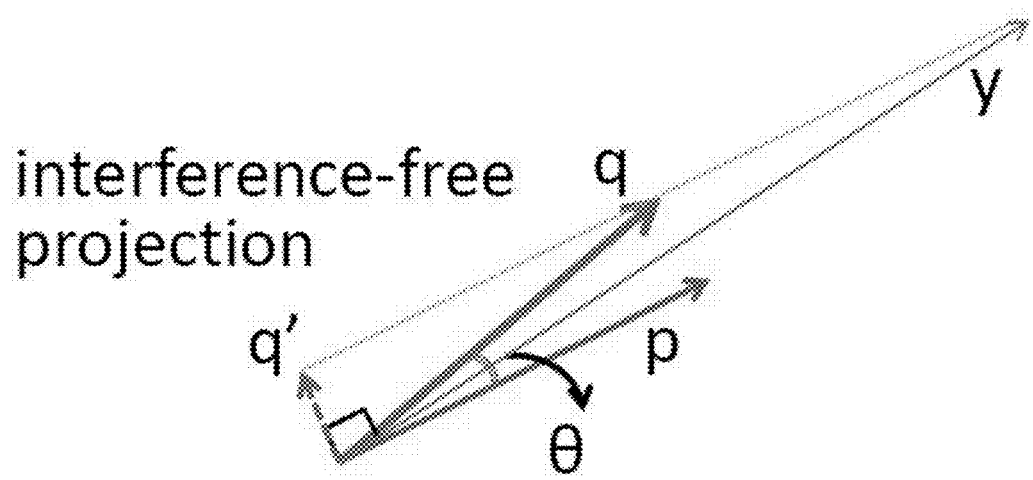
FIG. 11 illustrates bitrate determination based on a direction of projection.
Figure 11:
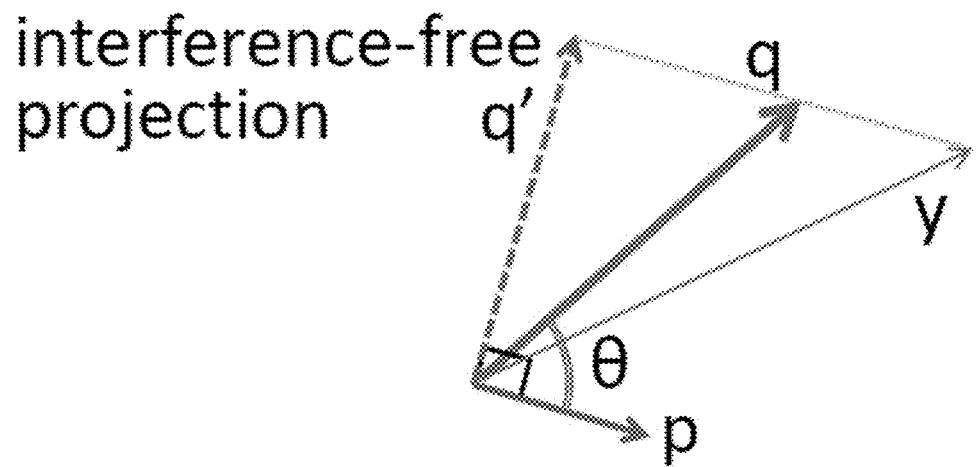

Referring to FIG. 11, a simple example is presented to illustrate why the optimal bitrate of a MIMO node depends on concurrent transmitters. Consider a 2-antenna receiver that is interested in decoding a signal q in the presence of a concurrent transmission p. The 2-antenna receiver receives the combined signal y in a 2-dimensional space. To decode q, it uses the standard MIMO decoding algorithm referred to as zero-forcing to project the received signal y on a direction orthogonal to p. This projection removes all interference from p and yields a signal q'=q sin θ, where θ is the angle between the two signals p and q. The signal after projection is a scaled version of the original signal of interest and hence can be decoded using any standard decoder. The problem however is that, depending on the value of θ, the projected signal q' might have a large or small amplitude. A larger amplitude yields a higher SNR (signal-to-noise ratio) and hence a higher bitrate. A smaller amplitude yields a lower SNR and hence a lower bitrate.

In conventional MIMO systems where all concurrent streams/transmissions are from the same transmitter, p and q come from the same node and hence the angle between them does not change as long as the channels themselves do not change. However, when concurrent streams/transmissions are from different nodes, the angle changes from one packet to the next, as the set of concurrent transmitters changes, even if the channels themselves did not change. Thus, such a system requires a per-packet bitrate selection mechanism.

In the random access protocol, each receiver uses the light-weight RTS of a packet to estimate the effective SNR (ESNR) after projection on the space orthogonal to ongoing transmissions. Intuitively, the ESNR is similar to the SNR in that it captures the link quality; however, it is more useful for computing the best bitrate since it takes into account the impact of frequency selectivity. Given the ESNR, the receiver then chooses a valid bitrate using a table that maps ESNR to the optimal bitrate and sends this decision back to the transmitter in the light-weight CTS message.

Note that an important characteristic of the above approach to bitrate selection is that a node can pick the optimal bitrate at the time it wins the contention without worrying about future contention winners. This is because transmitters that join ongoing transmissions avoid creating interference to existing receivers. This means that a single-antenna transmitter that wins the first degree of freedom observes a link quality that is unaffected by concurrent transmissions, and hence can use any standard bitrate selection algorithm to decide its best bitrate. A transmitter that wins contention in the presence of ongoing transmissions needs to pick the best bitrate given the current transmissions, but needs not worry about additional concurrent transmissions.

Figure 12:
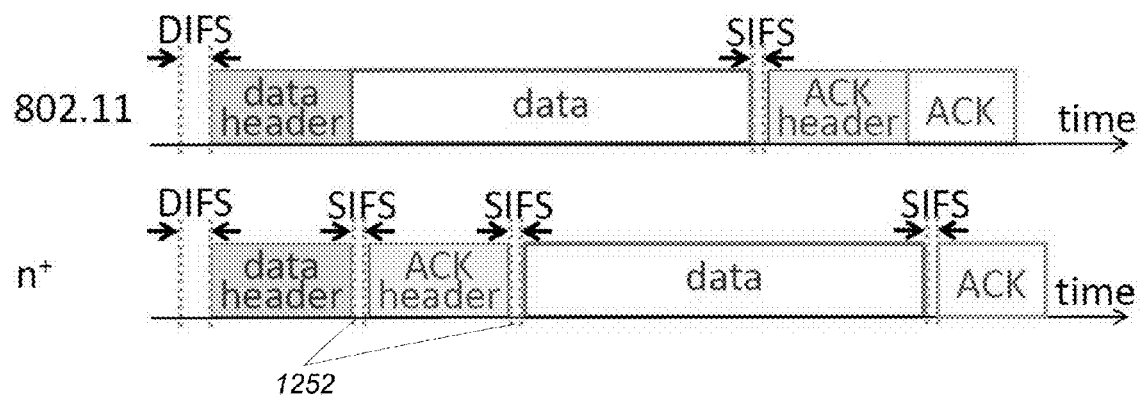
FIG. 12 illustrates a lightweight RTS-CTS.

Before data exchange, according to the random access protocol the receiver informs its sender of the best bitrate, and broadcasts the alignment space to nodes that are interested in concurrent transmissions. This objective can be achieved by preceding each packet with an RTS-CTS handshake. RTS-CTS frames, however, would introduce a relatively high overhead. The random access protocol adopts a different design that achieves the goal but without sending any control frames. To do so, the random access protocol uses a recent design called the light-weight handshake. A light-weight handshake is based on the observation that 802.11 channel coefficients do not change for periods shorter than multiple milliseconds. Hence, one can split a packet header from the packet body, and make the sender and receiver first exchange the data and ACK headers and then exchange the data and ACK bodies without additional headers. FIG. 12 compares this process with a standard data-ack exchange in 802.11.

In general, it has been empirically determined that the impact of separating a packet's header from its body is insignificant on decodability, namely the packet loss rate increases on average by 0.0005, which is negligible for a wireless network.

The overhead of a light-weight handshake is minimal. Specifically, the overhead is two SIFS intervals 1252, as shown in FIG. 12, and a per header checksum. In addition, each protocol may augment the standard data or ACK header with protocol-specific fields. In the case of the random access protocol, the standard data and ACK headers already contain most of the needed information. Specifically, they contain a preamble for computing the channels, the packet length which implies its duration given a bitrate, the number of antennas, and the sender and receiver MAC addresses. In addition, the random access protocol augments the ACK header with the bitrate and the alignment space. Since the random access protocol performs nulling and alignment on each OFDM subcarrier independently, a receiver needs to send the alignment space for each of the 802.11's 64 OFDM subcarriers. The random access protocol leverages that the channel coefficients change slowly with OFDM subcarriers, and hence the alignment space in consecutive subcarriers is fairly similar. Thus, the random access protocol sends the alignment space $U$ of the first OFDM subcarrier, and the alignment difference $(U_i - U_{i-1})$ for all subsequent subcarriers. Experimental results obtained from a testbed of USRP2 radios in both line-of-sight and non-line-of-sight locations show that differential encoding can on average compress the alignment space into three OFDM symbols. Since the CRC and bitrate values fit within one OFDM symbol, the header size in the random access protocol increases by four OFDM symbols in the case of an ACK, and one OFDM symbol in the case of a data packet.

Thus, the total overhead from the light-weight handshake is 2 SIFS plus 4 OFDM symbols, which is about 4% overhead for a 1500-byte packet transmitted at 18 Mb/s. Note that these results are for USRP2 channels which have a 10 MHz width. 802.11 channels span 20 MHz and hence are likely to show more variability in the alignment space of different OFDM subcarrier. Hence, the number above should be taken as a rough estimate that indicates that the overhead is significantly smaller than the gain.

Finally, to support scenarios where a single node transmits concurrently to multiple receivers, a single light-weight RTS (i.e., the data header) is allowed to contain multiple receiver addresses along with the number of antennas used for each receiver. The receivers send their light-weight CTS's (i.e., their ACK headers), one after the other, in the same order they appear in the light-weight RTS.

A number of practical issues are addressed below.

In some examples, the light-weight handshake mechanism used the random access protocol has the side-effect of providing the functionality of RTS-CTS which alleviates the hidden terminal problem. Further, in the random access protocol, if a node misses or incorrectly decodes one of the RTS or CTS messages from prior contention winners or its own exchange, it does not transmit concurrently. Operationally this is similar to missing a traditional RTS or CTS.

In some examples, when a node conforming to the random access protocol transmits a packet, it keeps the packet in its queue until the packet is acked. If the packet is not acked, the next time the node wins the contention, it considers the packet for transmission. However, since the node always needs to finish with other concurrent transmissions, the packet may be fragmented differently or aggregated with other packets for the same receiver.

The discussion up to this point has been focused on narrowband channels. However, the same description can be extended to work with wideband channels which exhibit multipath effects. Specifically, such channels use OFDM, which divides the bandwidth into orthogonal subcarriers and treats each of the subcarriers as if it was an independent narrowband channel. Our model naturally fits in this context. Specifically, like today's 802.11, the random access protocol treats each OFDM subcarrier as a narrowband channel and performs nulling and alignment for each OFDM subcarrier separately.

In some example, to avoid inter-carrier interference, concurrent transmitters should have the same carrier frequency offset (CFO) with respect to every receiver. Thus, senders conforming to the random access protocol compensate for their frequency offset. Specifically, as they decode the RTS from the transmitter that won the first degree of freedom, all concurrent transmitters naturally estimate their frequency offset with respect to the first transmitter. They compensate for that frequency offset by multiplying their digital signal samples by $e^{j2\pi\Delta f t}$ where $\Delta f$ is the frequency offset and $t$ is time since the beginning of the transmission. This process synchronizes all transmitters in the frequency domain without requiring any explicit coordination.

In some examples, to prevent inter-symbol interference (ISI), concurrent transmitters have to be synchronized within a cyclic prefix of an OFDM symbol. In particular, any transmitter that wants to join ongoing transmissions estimates the OFDM symbol boundaries of ongoing transmissions and synchronizes its transmission with them. To deal with additional delays due to channel propagation and hardware turn-around time, both the cyclic prefix and the OFDM FFT size are scaled by the same factor. A longer cyclic prefix provides additional leeway for synchronization at the transmitters. Further, this scaling does not increase the overhead because the percentage of cyclic prefix to data samples stays constant.

In practice, it is impossible to achieve perfect nulling or alignment due to hardware non-linearities. This means that there is always some residual noise. However, as long as the interference is reduced below the noise level of the hardware, the interference becomes negligible. For example, say that, in the absence of nulling or alignment, the interferer achieves a 25 dB SNR at a particular receiver. Then if nulling or alignment reduces the interference power by over 25 dB, the interference will be below the noise, and its impact is relatively negligible.

Thus, in the random access protocol a transmitter joins an ongoing transmission only if it can reduce its interference power below the noise power. Specifically, say that interference nulling and alignment in practice can reduce the transmitter power by L dB (our empirical results show that L is about 25-27 dB). A transmitter that wants to contend for the unused degrees of freedom estimates the power of its signal at each receiver of the ongoing transmissions. The transmitter can do so because it knows the channel to these receivers and hence it knows the attenuation its signal would experience. If the resulting signal power after channel attenuation is below L dB, the transmitter contends for transmitting concurrently. On the other hand, if the signal power after channel attenuation is still higher than L, the transmitter reduces its own transmission power so that after attenuation it is less than L dB. The transmitter contends (and if it wins the contention transmits) at this lower power, which can be canceled using practical interference nulling and/or alignment.

In some examples, components used in the random access protocol such as projections and estimation of the MIMO channel values are already used in current 802.11n for decoding point-to-point MIMO packets. Further, the computational requirement of computing the alignment and nulling spaces is similar to that of computing beamforming matrices in current 802.11n. Given the similarity between the components of the random access protocol and those used in today's hardware, the random access protocol can be built in hardware without significant additional complexity.

In some examples, the design of the random access protocol is implemented using software radios. Each node in the testbed is equipped with USRP2 boards and RFX2400 daughterboards, and communicates on a 10 MHz channel. Since USRP2 boards cannot support multiple daughterboards, a MIMO node is built by combining multiple USRP2's using an external clock. MIMO nodes which have up to three antennas are evaluated. Further, parts of the random access protocol are built on GNURadio OFDM code base, using different 802.11 modulations (BPSK, 4QAM, 16QAM, and 64QAM) and coding rates, to implement the effective-SNR based bitrate selection algorithm.

The following components of the design were implemented: carrier sense, light-weight RTS-CTS, alignment and nulling, bitrate selection, and frequency offset correction. However, due to the timing constraints imposed by GNURadio, carrier sense was evaluated independently from light-weight RTS-CTS and data transmission. Also, ACKs were not implemented. To perform nulling and alignment efficiently, concurrent transmitters have to be synchronized within a cyclic prefix. To achieve this goal, USRP2 timestamps were exploited to synchronize the transmitters despite the delays introduced by operating in software. A trigger signal was sent and the transmitters were made to log the time of detecting the trigger, $t_{start}$. The transmitters then add a large delay, $t_\Delta$, and set the timestamps of their concurrent transmissions to $t_{start}+t_\Delta$. The value of $t_\Delta$ depends on the maximum delay due to software processing, which in our testbed is 5 ms.

It should be recognized that the approaches described above may be implemented in hardware (e.g., digital and/or analog circuitry). It should also be recognized that some or all parts of the systems embodying these approaches may be implemented in software (e.g., "firmware") that includes instructions (e.g., stored on a tangible non-transitory medium, such as a semiconductor memory) for controlling a special purpose processor (e.g., a software-based radio) and/or a general purpose processor (e.g., implementing a communication protocol stack). It should also be recognized that the approach can be embodied in circuitry that is represented in software (or other functional descriptive matter), such as in a hardware description language (e.g., Verilog), which may be embodied on a tangible non-transitory medium, that can be used to control or as part of a process that yields a tangible semiconductor implementation of the approach, or in software that includes instructions for configuring a field programmable logic (e.g., a "personality matrix" for an FPGA).

It is to be understood that the foregoing description is intended to illustrate and not to limit the scope of the invention, which is defined by the scope of the appended claims. Other embodiments are within the scope of the following claims.

What is claimed is:

1. A communication method comprising:
   monitoring one or more transmissions received at multiple antennas over a communication medium;
   determining a first relationship between signals received from the antennas;
   determining whether the determined relationship is compatible with transmission of an information bearing signal via the multiple antennas concurrently with the one or more transmissions;
   determining a second relationship between signals for transmission via each of the multiple antennas according to the determined first relationship between signals received from the antenna; and
   sending a transmission from said antennas according to the determined second relationship concurrently with the one or more transmissions on the medium.

2. The method of claim 1 wherein the communication medium comprises a radio communication medium.

3. The method of claim 1 comprises determining a dimensionality of one or more transmission.

4. The method of claim 3 wherein determining the dimensionality comprises determining a number of data streams.

5. The method of claim 3 wherein determining the dimensionality comprises determining a dimensionality of transmissions without requiring decoding of said transmissions.

6. The method of claim 1 wherein determining whether the determined relationship is compatible comprises determining whether a number of antennas exceeds a dimensionality of the one or more transmissions.

7. The method of claim 6 wherein the number of antennas comprises at least one of a number of antennas available for transmitting and a number of antennas available for receiving the transmission.

8. The method of claim 1 further comprising:
sending a transmission from said antennas according to the determined second relationship concurrently with the one or more transmissions on the medium.

9. A communication method comprising:
determining a first relationship between signals received at multiple antennas of a first station from one or more transmissions over a communication medium;
determining, according to the first relationship, a second relationship between signals suitable for reception of an information bearing transmission at said antennas concurrently with said one or more transmissions;
sending information over the medium from the station sufficient for another multiple antenna system to form a transmission that matches the second relationship; and
receiving a concurrent transmission from the another multiple antenna system according to the second relationship.

10. The method of claim 9 further comprising receiving a request to transmit from the other station, and in response sending the information as an indication that the other station is clear to send a concurrent transmission to the first station according to the second relationship.

11. The method of claim 9 wherein receiving the concurrent transmission includes cancelling an effect of the one or more transmissions.

12. The method of claim 9 wherein sending the information over the medium comprises broadcasting said information for reception at multiple other stations.

13. The method of claim 12 wherein the information is further sufficient for another station to form a transmission that matches the first relationship.

14. The method of claim 12 wherein the information is further sufficient for another station to form a transmission that is substantially cancelled at the multiple antenna of the first station.

* * * * *